United States Patent [19]
Caldwell et al.

[11] Patent Number: 6,081,226
[45] Date of Patent: Jun. 27, 2000

[54] MULTI-MODE RADAR EXCITER

[75] Inventors: Stephen P. Caldwell, Columbia; Francis W. Hopwood, Severna Park; Thomas K. Lisle, Jr.; Wayne Weigle, both of Ellicott City, all of Md.

[73] Assignee: Northrop Grumman Corporation, Los Angeles, Calif.

[21] Appl. No.: 09/113,210

[22] Filed: Jul. 10, 1998

[51] Int. Cl.[7] ................................................. G01S 7/282
[52] U.S. Cl. .......................... 342/200; 342/203; 342/204
[58] Field of Search ..................................... 342/200, 201, 342/202, 203, 204, 195, 194, 129, 128, 131, 132, 135, 137

[56] References Cited

U.S. PATENT DOCUMENTS

| | | | |
|---|---|---|---|
| 4,968,968 | 11/1990 | Taylor | 342/174 |
| 5,309,160 | 5/1994 | Powell et al. | 342/128 |
| 5,361,072 | 11/1994 | Barrick et al. | 342/133 |
| 5,506,583 | 4/1996 | McVicker | 342/25 |
| 5,719,579 | 2/1998 | Torre et al. | 342/13 |
| 5,732,107 | 3/1998 | Phillips et al. | 375/296 |
| 5,861,834 | 1/1999 | Sauer et al. | 342/13 |
| 5,867,535 | 2/1999 | Phillips et al. | 375/295 |

FOREIGN PATENT DOCUMENTS 9635961  11/1996  WIPO ............................. G01S 13/42

*Primary Examiner*—John B. Sotomayor

[57] ABSTRACT

A radar exciter including a direct digital synthesis (DDS) wideband waveform generator which performs the frequency synthesis function heretofore performed by a direct analog synthesizer. This is achieved by deriving the DDS frequencies, the exciter RF frequencies, the radar synchronizer clock frequency and receiver analog/digital (A/D) converter clock frequency from a common signal source generating a master frequency. The present invention eliminates the direct analog synthesizer and relies solely on the digital generation of waveforms by a DDS wideband waveform generator which performs a discrete sampling process so as to provide coherent frequency and timing relationships.

20 Claims, 5 Drawing Sheets

MULTI-MODE RADAR EXCITER

BACKGROUND OF THE INVENTION

1. Field of the Invention

This invention relates generally to radar exciter architectures and more particularly, to an exciter including a wideband digital waveform generator which simplifies the circuitry employed in a multi-mode radar.

2. Description of Related Art

An exciter block diagram for a conventional multi-mode radar requiring a wide variety of waveforms is shown in FIG. 1. The exciter shown in FIG. 1 includes a master oscillator 10, a reference frequency generator 12 which generates a synchronizer clock signal and two of three receiver local oscillator signals LO2 and LO3, a narrowband waveform generator(s) 14, frequency upconversion circuitry 16 which generates the third local oscillator signal LO1 and a transmit timing (PRF) signal, a wideband waveform generator 18 and a frequency synthesizer 20.

Wideband waveforms required by the radar and generated by the wideband waveform generator 18 utilizes direct digital synthesis (DDS) techniques while the frequency synthesizer 20 provides frequency synthesis by direct analog synthesis (DAS). The DAS technique uses mixers, filters and switches, not shown, to select combinations of various CW frequencies to generate the required frequencies for radar frequency agility. It should be noted, however, that when desirable, other types of frequency synthesizers, such as indirect frequency synthesizers, can be used.

The benefits of direct analog synthesis DAS are low phase-noise and fast switching. However, this technique typically requires an expensive and complex complement of microwave hardware which adversely affects size, weight, power, and cost. New radar systems, on the other hand, now have an inherent requirement to reduce size, weight, power and cost.

SUMMARY

Accordingly, it is an object of the present invention to provide improvement in radar apparatus.

It is another object of the invention to provide an improvement in radar exciter architectures which generate waveforms including medium and wideband linear and non-linear FM modulation and phase codes.

It is a further object of the invention to provide an improved radar architecture which also provides frequency agility.

It is yet a further object of the invention to provide an improved radar exciter which reduces the complex frequency mixing and divider sections of the frequency synthesizer section of the radar.

And it is still a further object of the invention to provide an improvement in radar exciter architectures wherein the number of fixed frequencies required are reduced in number.

The foregoing and other objects are achieved by using a direct digital synthesis (DDS) wideband waveform generator to perform the frequency synthesis function heretofore performed by a direct analog synthesizer. This is achieved by providing a certain predetermined frequency and timing relationship of DDS frequencies, exciter RF frequencies, radar synchronizer clock frequency and receiver analog/digital (A/D) converter clock frequency. The present invention eliminates the direct analog synthesizer and relies solely on the digital generation of waveforms by a DDS wideband waveform generator which performs a discrete sampling process thereby allowing exploitation of the frequency and timing relationships available in a radar system. FIG. 2 is a block diagram of the subject invention.

Coherent signal generation and reception is achieved by deriving all frequencies and waveforms in the radar system from one master oscillator frequency and wherein the radar includes: a master oscillator, a CW reference frequency generator, a synchronizer, a digital waveform generator having a direct digital synthesis capability, a frequency up-conversion unit, a receiver, a radar digital signal processor, and an analog to digital converter for converting analog signals from the receiver to digital signals for use by the processor.

The digital waveform generator generates a clock signal $f_s$ which is applied to the synchronizer. Following receipt of a start strobe signal $f_{st}$ from the synchronizer, the digital waveform generator is responsive to a clock signal $f_w$ from the CW reference frequency generator to generate a DWG OUT signal for frequency upconversion, and at least one offset frequency signal $f_o$ but preferably two offset signals $f_{o1}$ and $f_{o2}$. The synchronizer also generates an analog to digital converter clock signal $f_a$ and a synchronous transmit PRF clock signal $f_r$. The following frequency relationships are maintained: the synchronizer clock frequency $f_s$ is equal to or a sub-multiple $M_1$ of the master oscillator frequency $f_m$, the digital waveform generator clock frequency $f_w$ is a multiple $N_1$ of the synchronizer clock frequency $f_s$; the A/D clock frequency $f_a$ is a multiple $N_2$ of the synchronizer clock frequency $f_s$; the digital waveform generator CW offset frequencies $f_{o1}$ and $f_{o2}$ are multiples $N_3$ of the synchronizer clock frequency $f_s$, the PRF clock signal has a frequency which is a sub-multiple $M_2$ of the synchronizer clock frequency $f_s$, and where the multiples N and sub-multiples M comprise non-zero positive integers.

Further scope of applicability of the present invention will become apparent from the detailed description provided hereinafter. However, it should be understood that the detailed description and specific example, while indicating a preferred embodiment of the invention is provided by way of illustration only, since various changes, modifications and alterations, within the spirit and scope of the invention will become apparent to those skilled in the art from the following detailed description.

BRIEF DESCRIPTION OF THE DRAWINGS

The present invention will become more fully understood when considered together with the accompanying drawings which are provided by way of illustration only and thus are not meant to be limitative of the invention, and wherein.

DETAILED DESCRIPTION OF THE INVENTION

Figure 1:
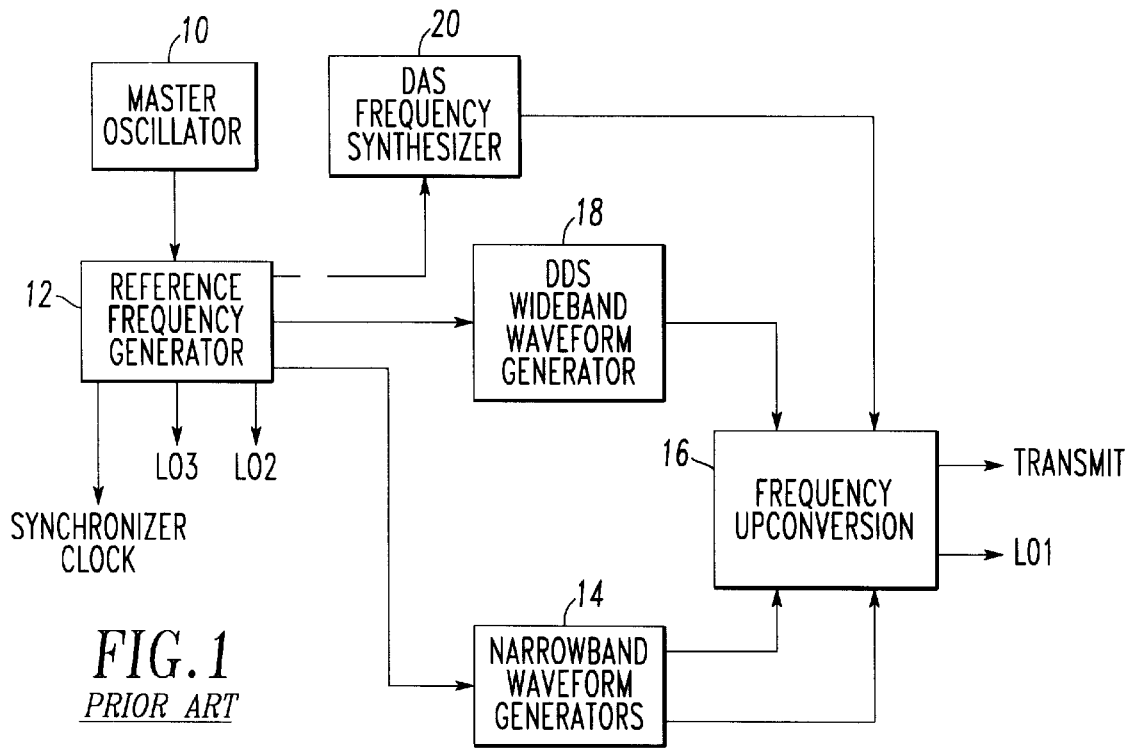
FIG. 1 is a block diagram and broadly illustrative of a multi-mode radar exciter in accordance with the known prior art.
Figure 2:
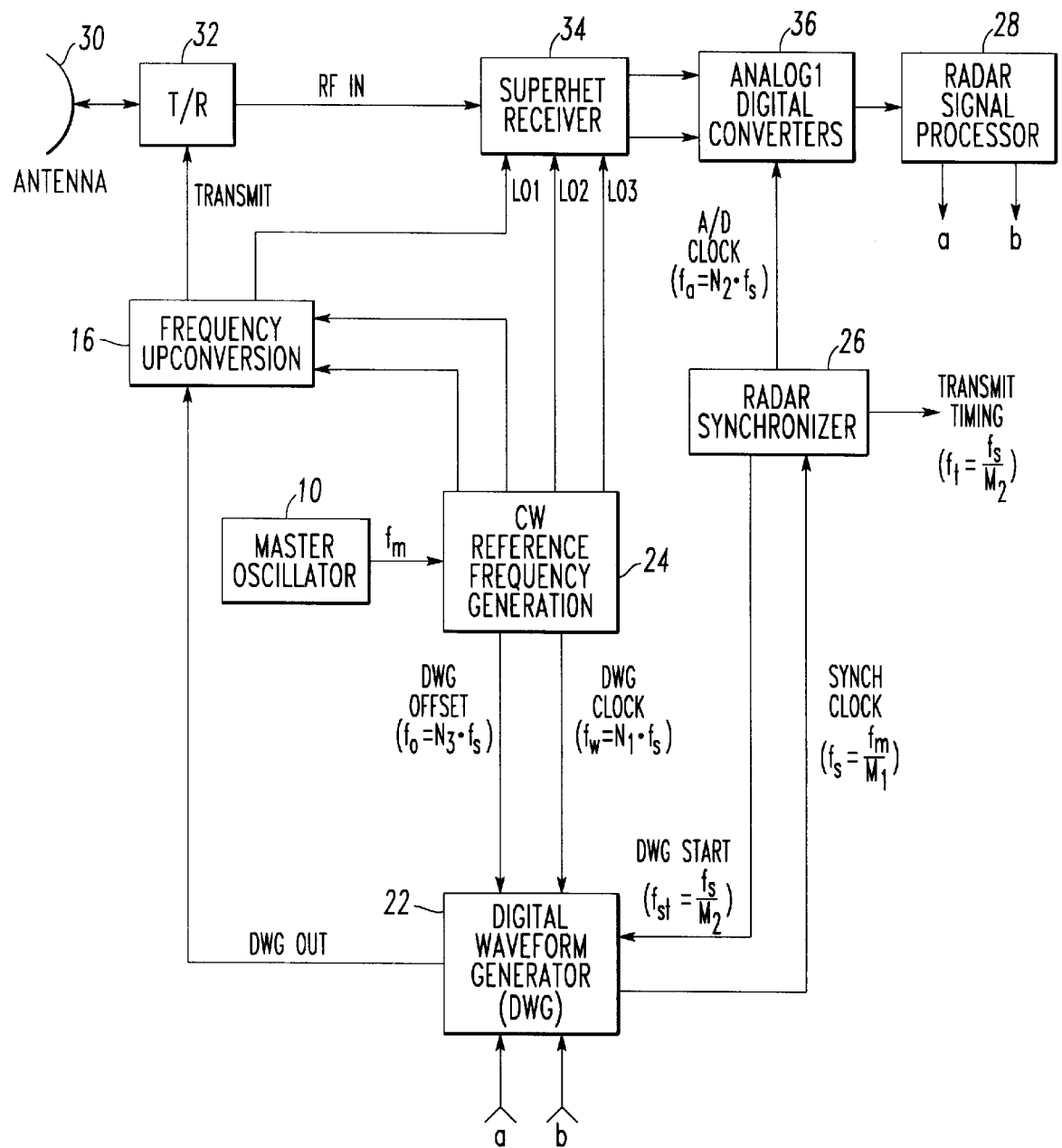
FIG. 2 is a block diagram generally illustrative of the preferred embodiment of the subject invention.

Referring now to the drawings, and more particularly to FIG. 2, shown thereat is a block diagram of a multi-mode radar system according to a preferred embodiment of the subject invention and which differs from that shown in FIG. 1 primarily by the elimination of the DAS frequency synthesizer 20. The system shown in FIG. 2 includes digital waveform generator (DWG) 22 and a CW reference frequency generator 24 in addition to the master oscillator 10 and frequency upconverter 16 of FIG. 1 along with a synchronizer unit 26, a radar signal processor 28, a bi-directional radar antenna 30, a transmit receive (TR) unit 32, a radar receiver 34, and an analog to digital (A/D) converter 36.

Figure 3A:
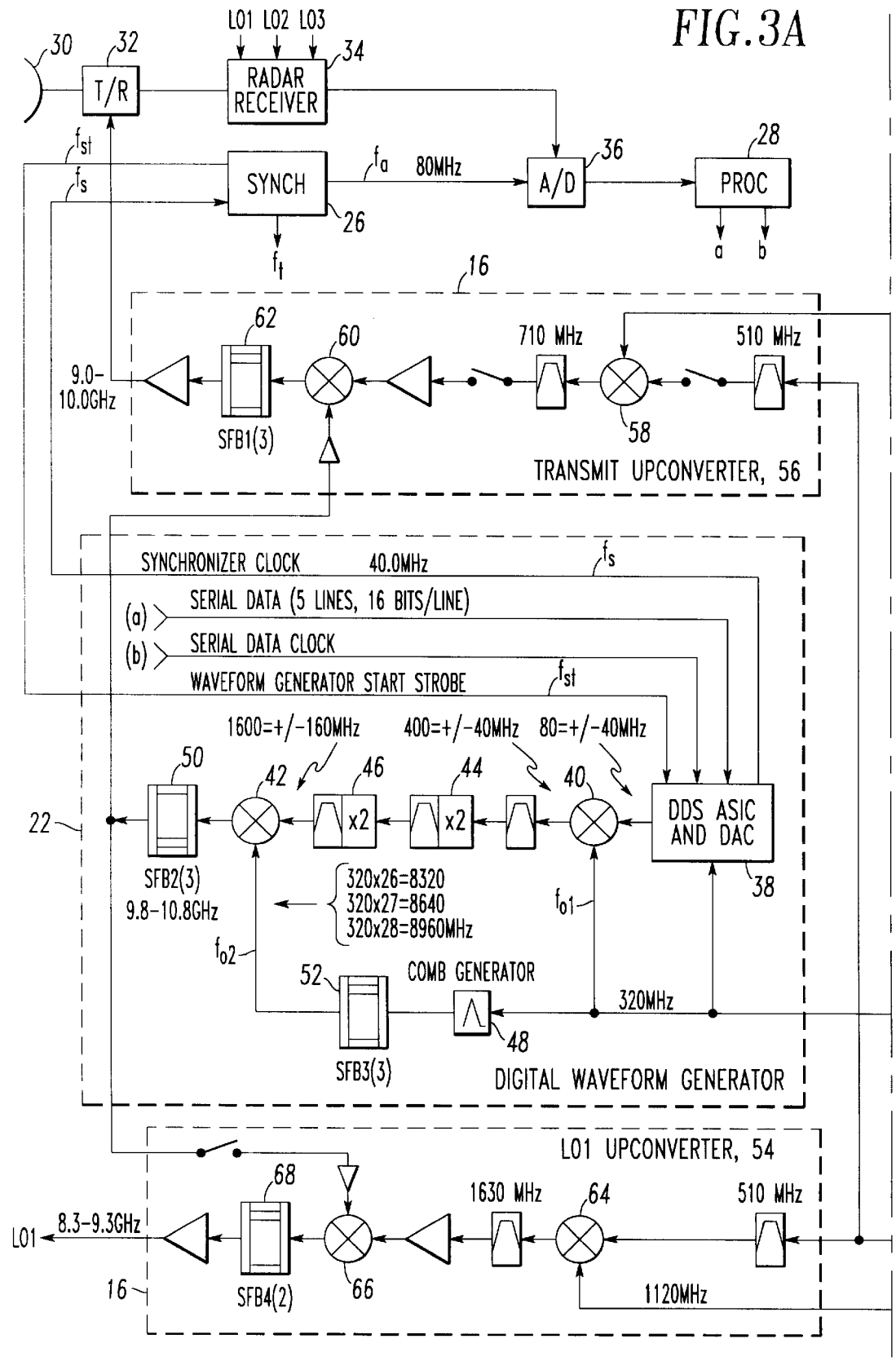
FIG. 3 is an electronic block diagram further illustrating the details of the embodiment of the subject invention shown in FIG. 2.
Figure 3B:
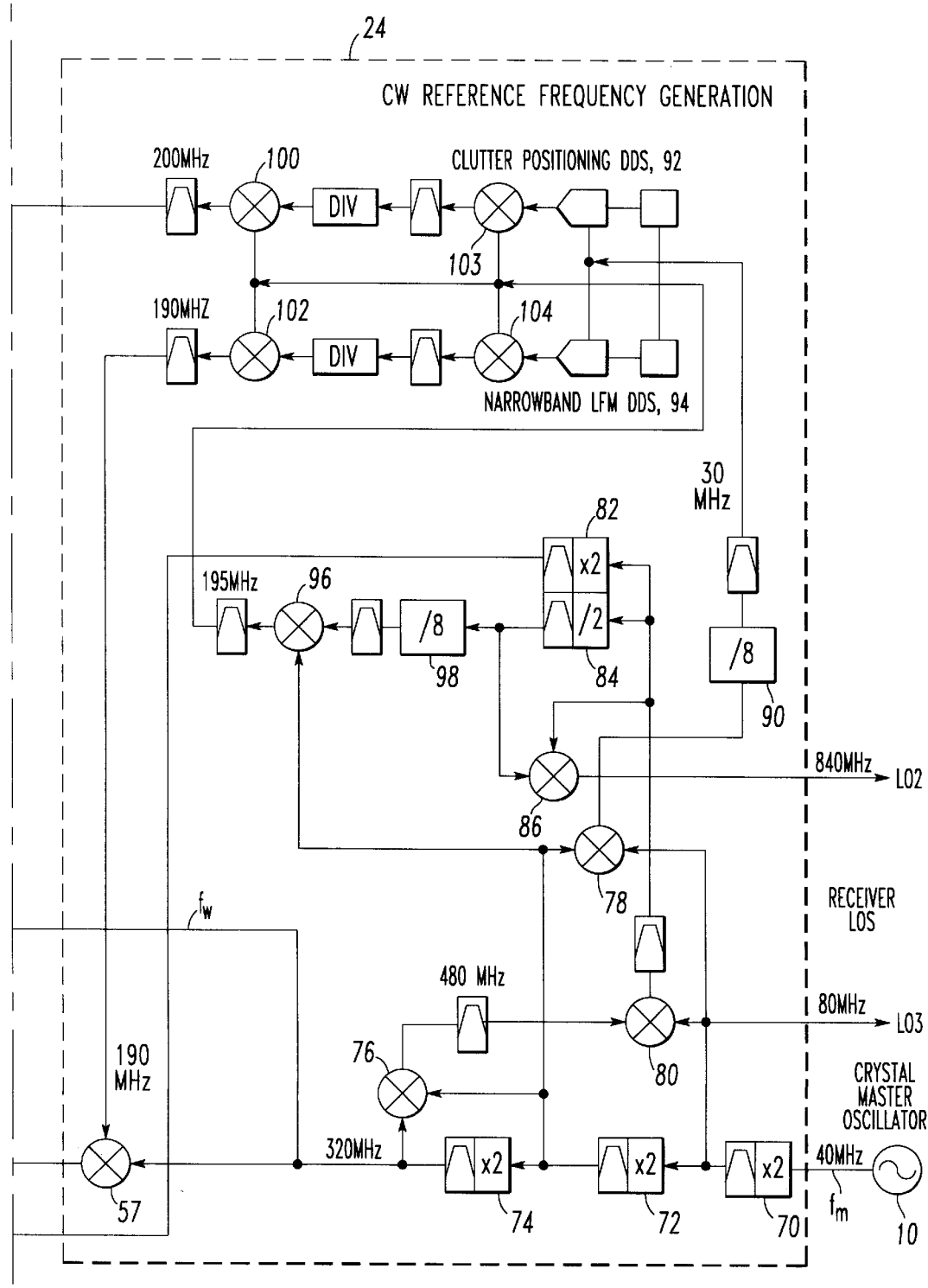

The CW reference frequency generator 24 now incorporates the narrowband waveform generating function of signal generator 14 of FIG. 1 in addition to generating local oscillator signals LO2 and LO3 in response to a signal having a frequency $f_m$ from the master oscillator 10. Moreover, the CW reference frequency generator 24 also generates a DWG clock signal having a frequency $f_w$ and at least one DWG offset signal having a frequency $f_o$, but preferably two or more offset frequencies $f_{o1}$ and $f_{o2}$ as shown in FIG. 3, which are fed to the digital waveform generator 22. The digital waveform generator 22 generates a clock signal for the synchronizer 26 having a frequency $f_s$. The synchronizer 26 in turn generates an A/D clock signal having a frequency $f_a$ for the A/D converter 36 as well generating a DWG start signal and a transmit timing signal having respective frequencies designated as $f_{st}$ and $f_t$, respectively.

Further as shown in FIG. 2, the digital waveform generator 22 receives a serial data stream (a) and a clock signal (b) for the serial data stream from the radar signal processor 28. However, it should be noted that, when desirable, the data can be supplied to the digital waveform generator 22 in a parallel data stream or a combination of parallel and serial data. In such a configuration, the digital waveform generator 22 generates waveforms which are in synchronism with the synchronizer transmit timing signal $f_t$ by virtue of the DWG START signal $f_{st}$ fed to the digital waveform generator 22 from the synchronizer 26.

As noted above, all frequencies in the radar according to the subject invention are derived from and therefore mathematically related to one master oscillator frequency $f_m$ which can range between VHF and X-Band and which is shown in FIG. 2 being fed to the reference frequency generator 24 whereupon the following frequency relationships are implemented and maintained; (1) the synchronizer clock signal $f_s$ is equal to or a sub-multiple $M_1$ of the master oscillator frequency $f_m$; (2) the digital waveform generator clock signal frequency $f_w$ is a multiple $N_1$ of the synchronizer clock frequency $f_s$; (3) the analog to digital converter clock signal frequency $f_a$ is a multiple $N_2$ of the synchronizer clock frequency $f_s$; (4) the frequency $f_o$ DWG offset signal (s) is equal to a multiple $N_3$ of the synchronizer clock frequency $f_s$; and (5) the radar transmit timing signal or PRF frequency $f_t$ is a sub-multiple $M_2$ of the synchronizer clock frequency $f_s$, where the multiples N and sub-multiples multiples M are positive integers greater than zero, e.g. 1, 2, 3, 4 . . . .

With the arrangement shown in FIG. 2, the digital waveform generator 22 is synchronized with the transmit timing signal generated by the synchronizer 26 and which establishes the radar pulse repetition frequency (PRF) $f_t$ which is selectively variable and comprises, for example, 25 nanosecond pulses having a frequency ranging between 100 Hz to 1 MHz. Also the A/D clock signal $f_a$ is synchronized to the radar PRF. Furthermore, the radar inter-pulse period (IPP) is a multiple of the synchronizer clock interval and provides known edge relationships as shown in FIG. 4.

Referring now to FIG. 3, shown thereat are details of the digital waveform generator (DWG) 22, the CW reference frequency generator 24 and the frequency upconverter 16 depicted in FIG. 2. The digital waveform generator 22 is comprised of a direct digital synthesis (DDS) application specific integrated circuit (ASIC) and digital analog converter (DAC) 38 along with a pair of signal mixers 40 and 42, a pair of frequency multipliers and associated filters 44 and 46, a comb frequency generator 48 and a pair of switched filter banks (SFB) 50 and 52. The DDS waveform generator 38 is generally known and is shown and described, for example, in U.S. Pat. No. 5,151,661, entitled "Direct Digital FM Waveform Generator for Radar Systems" issued to Stephen P. Caldwell et al. on Sep. 29, 1992.

Figure 4:
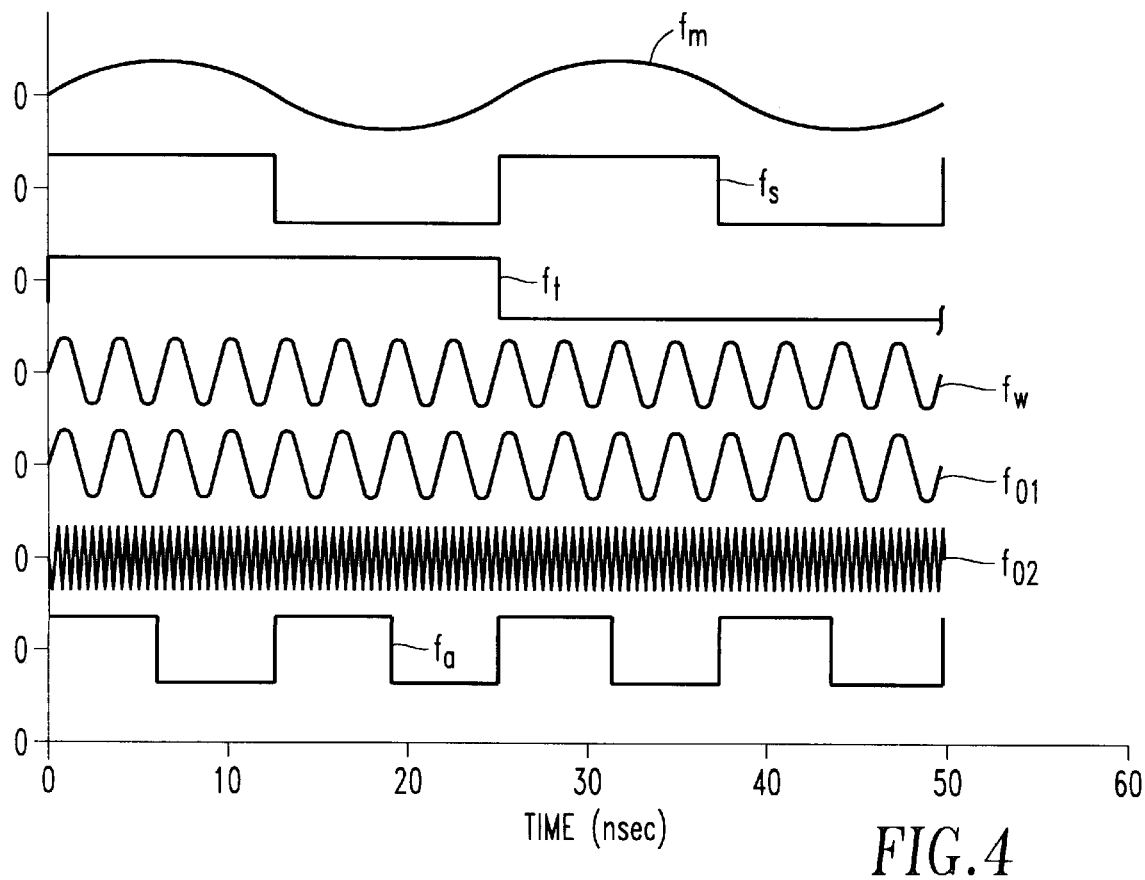
FIG. 4 is a set of waveforms helpful in understanding the operation of the invention as shown in FIG. 3;.

Starting with a crystal master oscillator generating a frequency $f_m$ of 40 MHz, the DDS waveform generator 38 is responsive to a $f_m \times 8 = 320$ MHz clock signal $f_w$ from the CW reference frequency generator 24 to generate a 40 MHz synchronizer clock signal $f_s$ as shown in FIG. 4. Subsequently, the DWG 22 is responsive to the serial data (a) and the serial data clock signal (b) from the radar signal processor 28 as well as a start strobe signal $f_{st}$ from the radar synchronizer 26 to generate an 80+40 MHz output signal which is used to generate a 9.8–10.8 GHz signal at the output of the switched filter bank 50 in response to a 320 MHz offset frequency $f_{o1}$ (FIG. 4) applied to mixer 40 and a second offset frequency $f_{o2}$, also shown in FIG. 4, and which is applied to the mixer 42 and which comprises a selected one of three frequencies of 8320 MHz, 8640 MHz, and 8960 MHz which are ×26, ×27 and ×28 multiples of 320 MHz and are generated by the comb generator 48. This signal is fed to a local oscillator upconverter section 54 of the upconverter 16 for generating a first local oscillator signal LO1 having a frequency range varying between 8.3–9.3 GHz and to a transmit upconverter section 56 for generating RF transmit carrier frequencies ranging between 9.0 GHz and 10.0 GHz.

Both upconverter sections 54 and 56 receive a 510 MHz signal from a mixer 57 in the reference frequency generator 24 where it is up converted for example, in the transmit upconverter section 56 by a mixer 58 additionally receiving a 200 MHz signal from the reference frequency generator 24. A 710 MHz signal is output therefrom which is coupled to a second mixer 60 which receives the 9.8–10.8 GHz output signal from the SFB 50 in the digital waveform generator 22 and whose output is fed to a SFB device 62 which couples its output to the TR unit 32.

The LO1 upconverter section 54 also includes a first mixer 64 which additionally receives an 1120 MHz signal from the reference frequency generator 24 where it mixes with the 510 MHz signal from the mixer 57 to generate a 1630 MHz output which is fed to mixer 66 along with the 9.8–10.8 GHz output from the SFB 50 in the digital waveform generator 22. The output of the mixer 66 is fed to a SFB device 68 which outputs a 8.3–9.3 GHz local oscillator signal LO1 to the radar receiver 34 shown in FIG. 3.

The CW reference frequency generator 24 consists of an arrangement of frequency multipliers, dividers and mixers shown comprising first a frequency doubler 70 which is directly connected to a 40 MHz output $f_m$ of the master oscillator 10. The output of the frequency doubler 70 accordingly comprises an 80 MHz output which comprises a local oscillator signal LO3 shown in FIG. 2 being applied to the receiver 34. Next, the 80 MHz output from the frequency doubler 70 is fed to a second frequency doubler 72 which outputs a frequency of 160 MHz and which is applied to a third frequency doubler 74 which outputs the 320 MHz DWG clock signal $f_w$. The 160 MHz signal from the frequency doubler 72 is also fed to a pair of mixers 76 and 78. The 320 MHz output from the frequency doubler 74 comprises the digital waveform generator clock signal $f_w$ as well as one input to the mixer 57 which outputs the 510 MHz input fed to the upconverter sections 54 and 56.

Further as shown in FIG. 3 the 480 MHz output from the mixer 76 is fed to a mixer 80 along with the 80 MHz from the frequency doubler 70 to generate a 560 MHz output which is commonly applied to a frequency doubler 82, a frequency divider (÷2) 84 and a mixer 86. The frequency doubler 82 outputs a 1120 MHz signal which is coupled to the mixer 64 in the upconverter section 54. The frequency divider 84 outputs a 280 MHz signal which is applied to the mixer 86 along with the 560 MHz signal to generate an 840 MHz local oscillator signal LO2.

Next, the output of the mixer 78 which comprises a 240 MHz signal is fed to a frequency divider (÷8) 90 which outputs a 30 MHz signal which is fed to a clutter positioning DDS section 92 and a narrowband LFM/DDS 94 which also receives a 195 MHz output from a mixer 96. Mixer 96 receives a 160 MHz output from the frequency doubler 72 and a 35 MHz output from a frequency divider (÷8) 98 which is connected to the 280 MHz output from the frequency divider (÷2) 84. The 195 MHz output from a mixer 96 is commonly fed to mixers 100, 102 and 103, 104. Mixers 100 and 102 respectively receive 5 MHz inputs from DDS 92 and LFM 94 with the mixer 100 providing a summed output of 200 MHz to the mixer 58 in the up converter section 56 while the mixer 102 provides a difference output of 190 MHz which is applied to the mixer 57. As shown, mixer 57 also receives a 320 MHz signal output from the frequency doubler 74 to provide a pair of 510 MHz outputs for the upconverter sections 54 and 56.

The utilization of DDS digital waveform generator 38 as a frequency synthesizer provides a much higher frequency resolution than is achieved by direct analog frequency synthesis (DAS). Therefore, many more frequencies are available at lower cost, size, weight and power.

Fast switching of digital waveform generator 38, moreover, permits different transmit and receiver LO1 frequencies within a radar interpulse period (IPP). This can eliminate additional exciter fixed frequencies needed for multiple receiver back ends, for example, In-Phase and Quadrature I/Q and IF sampling A/D converters. Moreover, fewer fixed frequencies are required in the exciter. This is a result of the harmonic relationship of frequencies required which result in less complicated fixed frequency generator design.

Thus, what has been shown and described is a multimode radar exciter system where the waveform generator clock frequency and the reference frequencies used to upconvert the digital waveform generator frequency is a multiple of the radar synchronizer clock frequency or stated another way the radar synchronizer clock frequency is a multiple of the waveform generator clock frequency. Also, since the A/D clock frequency is an integer submultiple of the synchronizer clock frequency, an alignment of the A/D clock with the inter-pulse (IPP) interval is achieved as shown by the waveforms in FIG. 4 so that suitable time samples can easily be collected. The aforementioned frequency relationships also result in a stationery signal at the A/D output so that no frequencies other than DC are present of particular significance is that the normally deleterious effects of DDS quantization and harmonics in DDS waveform generator 38 and mixer intermodulation products in mixers 40 and 42 of DWG 22 are also stationary in the output of the A/D converter 36. As such, they too appear in the clutter notch Since DC falls in the clutter notch, pulse doppler radar modes are unaffected.

Figure 5:
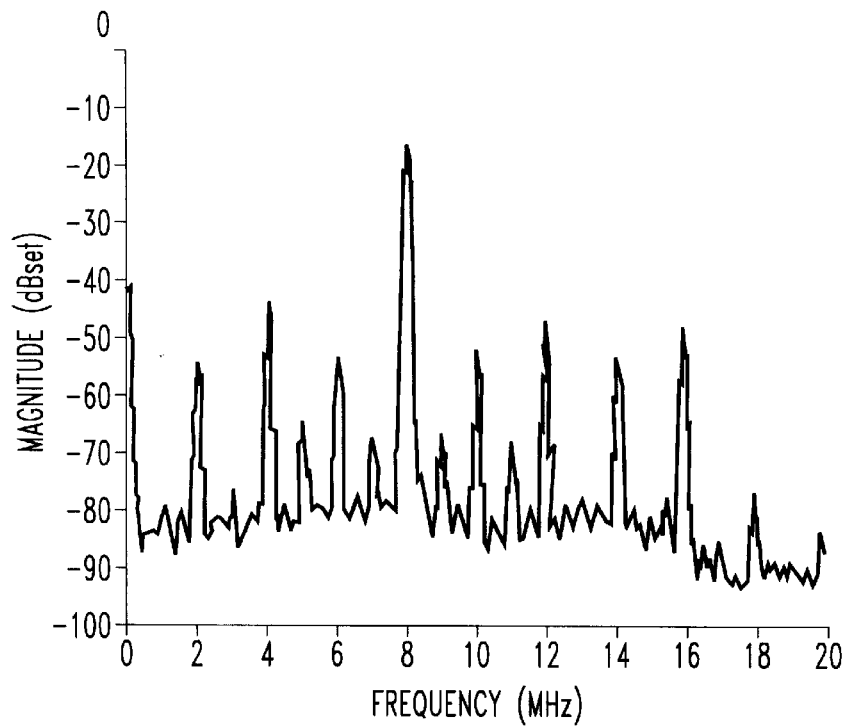
FIG. 5 is illustrative of the power spectrum for a prior art system such as shown in FIG. 1.
Figure 6:
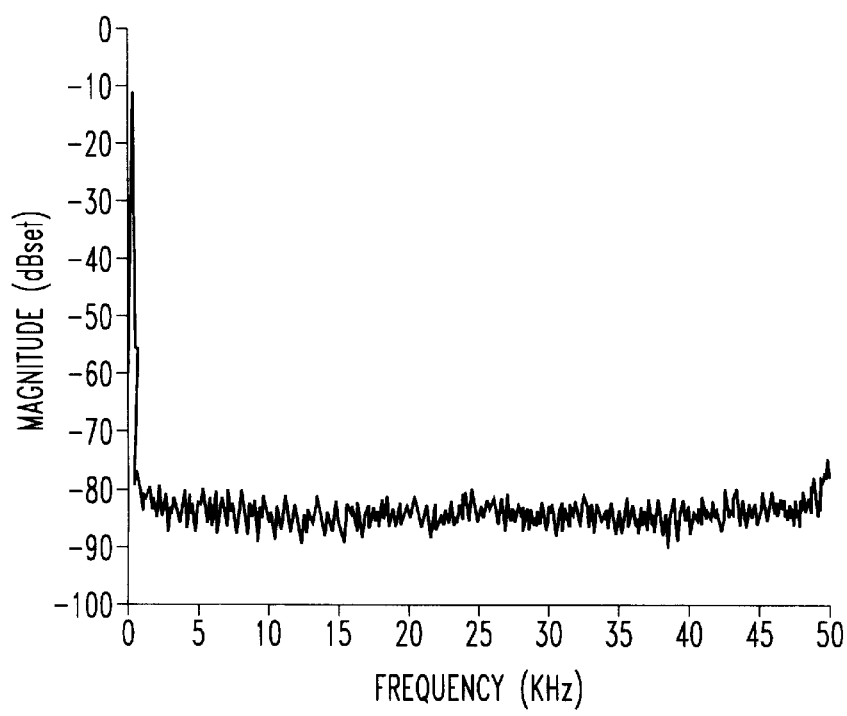
FIG. 6 is illustrative of the power spectrum for a system in accordance with the subject invention.

This results in a power spectrum as shown in FIG. 6 being developed as opposed to a power spectrum such as shown in FIG. 5 and which is generated by prior art radar apparatus (FIG. 1). No restrictions on the type of waveform or quantatization or waveform generator are required. This is a significant fact and results in broad applications of digital waveform generation including linear FM, non-linear FM, phase coding, and frequency synthesis.

It should also be noted that any digital waveform generator having the properties described herein can be utilized in this invention. While the DDS waveform generator shown in FIG. 3 is a preferred implementation, a sigma-delta or delta-sigma waveform generator could be used when designed so as to provide the frequency and timing relationship described heretofore.

Having thus shown and described what is at present considered to be the preferred embodiment of the invention it should be noted that the same has been made by wave illustration and not limitation. Accordingly, all modifications, alterations, and changes coming within the spirit and scope of the invention as set forth in the pending claims are meant to be included.

We claim:

1. A direct digitally synthesized (DDS) radar exciter for generating a set of coherent waveforms for transmitting and receiving radar signals, comprising:

a master signal source generating a signal having a master frequency;

a reference frequency generator coupled to said master signal source, being responsive to the master frequency signal outputted thereby and generating therefrom a digital waveform generator clock signal, at least one offset frequency signal, and at least one local oscillator signal;

a digital waveform generator coupled to said reference frequency generator, being responsive to said digital waveform generator clock signal for generating a synchronizer clock signal, and being additionally responsive to said at least one offset frequency signal for generating a radar signal for transmission;

a radar synchronizer coupled to said digital waveform generator and being responsive to the synchronizer clock signal for generating a transmit timing (PRF) clock signal, a clock signal for an analog to digital converter which converts analog signals from a radar receiver to digital signals for a radar signal processor, and a digital waveform generator start signal;

said radar signal processor generating a data signal and a data clock signal applied to the digital waveform generator for generating said radar signal for transmission and at least one other local oscillator signal, and wherein the synchronizer clock signal, the digital waveform generator clock signal, the at least one offset frequency signal, the transmit timing clock signal and the clock signal for the analog to digital converter are derived from and have frequencies which are mathematically related to the master frequency of said master signal source.

2. A radar exciter in accordance with claim 1 wherein said frequencies which are mathematically related to the master frequency comprise non-zero integer multiples or submultiples of the master frequency.

3. A radar exciter in accordance with claim 1 wherein the synchronizer clock signal frequency is a sub-multiple of the master frequency.

4. A radar exciter in accordance with claim 3 wherein the sub-multiple of the master frequency comprises a non-zero integer sub-multiple of the master frequency.

5. A radar exciter in accordance with claim 4 wherein the non-zero integer sub-multiple includes unity.

6. A radar exciter in accordance with claim 1 wherein the synchronizer clock signal frequency is equal to the master frequency.

7. A radar exciter in accordance with claim 1 wherein the synchronizer clock signal frequency is equal to or a non-zero integer sub-multiple of the master frequency.

8. A radar exciter in accordance with claim 7 wherein the digital waveform generator clock frequency is a multiple of the synchronizer clock frequency.

9. A radar exciter in accordance with claim 7 wherein the digital waveform clock frequency is a non-zero integer multiple of the synchronizer clock frequency.

10. A radar exciter in accordance with claim 7 wherein said at least one offset frequency signal is a multiple of the synchronizer clock frequency.

11. A radar exciter in accordance with claim 7 wherein said at least one offset frequency signal is a non-zero integer multiple of the synchronizer clock frequency.

12. A radar exciter in accordance with claim 7 wherein said at least one offset frequency signal comprises a plurality of offset frequency signals and wherein each of said signals comprise a non-zero integer multiple of the synchronizer clock frequency.

13. A radar exciter in accordance with claim 7 wherein the clock signal for the analog to digital converter has a frequency which is a multiple of the synchronizer clock frequency.

14. A radar exciter in accordance with claim 7 wherein the clock signal for the analog to digital converter has a frequency which is a non-zero integer multiple of the synchronizer clock frequency.

15. A radar exciter in accordance with claim 7 wherein the transmit timing clock signal comprises a PRF signal having a frequency which is a sub-multiple of the synchronizer clock frequency.

16. A radar exciter in accordance with claim 7 wherein the PRF signal has a frequency which is a non-zero integer sub-multiple of the synchronizer clock frequency.

17. A radar exciter in accordance with claim 1 wherein the synchronizer clock frequency is equal to or a sub-multiple of the master frequency, the digital waveform generator clock frequency is a multiple of the synchronizer clock frequency, the analog to digital clock frequency is a multiple of the synchronizer clock frequency, the at least one digital waveform generator offset frequency is a multiple of the synchronizer clock, the transmit timing clock signal has a frequency which is a sub-multiple of the synchronizer clock frequency, and where the multiples and sub-multiples comprise non-zero positive integers.

18. A radar exciter in accordance with claim 17 wherein said at least one digital waveform generator offset comprises a pair of offset frequencies and wherein one frequency of said pair of offset frequencies is lower than the other frequency of said pair of offset frequencies.

19. A radar exciter in accordance with claim 18, said one frequency comprises a first fixed frequency, and said other frequency comprises a second fixed frequency selected from a plurality of other fixed frequencies.

20. A radar exciter in accordance with claim 1 wherein said signal source generating the master frequency comprises a source ranging in frequency from VHF to and including X-Band.

* * * * *